(12) United States Patent
Han (10) Patent No.: US 8,475,170 B2
(45) Date of Patent: Jul. 2, 2013

(54) TOOL FOR REALIZING THE KOREAN ALPHABET USING A CONSONANT AND VOWEL COMBINATION SYSTEM

(75) Inventor: Jae Joon Han, Seoul (KR)

(73) Assignee: Industry Academic Cooperation Foundation of Seoul Women's University, Seoul (KR)

( * ) Notice: Subject to any disclaimer, the term of this patent is extended or adjusted under 35 U.S.C. 154(b) by 176 days.

(21) Appl. No.: 13/148,628

(22) PCT Filed: Feb. 10, 2010

(86) PCT No.: PCT/KR2010/000827
§ 371 (c)(1), (2), (4) Date: Aug. 9, 2011

(87) PCT Pub. No.: WO2010/093167
PCT Pub. Date: Aug. 19, 2010

(65) Prior Publication Data
US 2011/0311288 A1   Dec. 22, 2011

(30) Foreign Application Priority Data
Feb. 10, 2009 (KR) .................. 10-2009-0010705

(51) Int. Cl.
*G09B 1/00* (2006.01)

(52) U.S. Cl.
USPC ........................................... 434/160

(58) Field of Classification Search
USPC .................. 434/156, 157, 159, 160, 161
See application file for complete search history.

(56) References Cited

U.S. PATENT DOCUMENTS

| 257,630 | A | * | 5/1882 | Whitney | 434/160 |
| 322,754 | A | * | 7/1885 | Schueller | 434/160 |
| 1,452,340 | A | * | 4/1923 | Hubbard | 434/160 |
| 2,175,939 | A | * | 10/1939 | Grudin | 434/160 |
| 2,682,118 | A | * | 6/1954 | Larsen | 434/160 |
| 2,693,963 | A | * | 11/1954 | Moscato | 273/157 R |
| 3,075,304 | A | * | 1/1963 | Votolato | 434/160 |
| 4,344,626 | A | * | 8/1982 | Wadland | 273/243 |
| 4,489,513 | A | * | 12/1984 | Reiner | 40/447 |
| 4,998,883 | A | * | 3/1991 | Brinkley | 434/159 |
| 6,932,613 | B2 | * | 8/2005 | Olsen et al. | 434/409 |
| 7,993,139 | B2 | * | 8/2011 | Lehmann | 434/160 |

FOREIGN PATENT DOCUMENTS

| KR | 20-1982-0001910 | 9/1982 |
| KR | 1020010059872 | 7/2001 |
| KR | 20-0418978 | 6/2006 |
| KR | 20-0424472 | 8/2006 |

* cited by examiner

Primary Examiner — Kurt Fernstrom
(74) Attorney, Agent, or Firm — IPLA P.A.; James E. Bame (57) ABSTRACT

A tool for implementing Korean characters using a consonant-vowel combination system, in which a simple and concise combination system capable of implementing all Korean characters 5 using only six consonants and vowels is constructed, and thus users of the tool may realize originality, superiority, and convenience of Korean letters in daily life. The tool for implementing Korean characters using a consonant-vowel combination system is configured to implement the Korean characters using six consonant and vowel plates. Therefore, users of the Korean letters may recognize value of the Korean letters from the heart and be proud of the Korean letters.

4 Claims, 11 Drawing Sheets

TOOL FOR REALIZING THE KOREAN ALPHABET USING A CONSONANT AND VOWEL COMBINATION SYSTEM

BACKGROUND OF THE INVENTION

1. Field of the Invention

The present invention relates to a tool for implementing Korean characters using a consonant-vowel combination system, and more specifically, to a tool for implementing Korean characters using a consonant-vowel combination system, in which a simple and concise combination system capable of implementing all Korean characters using only six consonants and vowels is constructed, and thus users of the tool may realize originality, superiority, and convenience of Korean letters in daily life.

2. Description of the Related Art

As is known to everybody, the Korean alphabet created by King Sejong in 1443 as a name of 'Hun-min-jeong-um' to visualize all the sounds in the nature of universe by combining 28 letters of consonants and vowels can be said as a representative cultural heritage of Korean people.

One time, the Korean alphabet was looked down upon even in Korea despite its originality and superiority. However, its superiority is recognized all over the world now, and thus a great many distinguished scholars and students in the world give praise to scientific accomplishment and originality of the Korean alphabet, and the number of foreigners writing, speaking, and using the Koreans alphabet tends to increase day by day.

Although the Korean alphabet is created in a superior, concise, and unified system as described above, it is frequently used in an inconvenient and complicated way and treated inattentively in many cases in reality. Furthermore, the problems arising from misunderstanding that the Korean alphabet as written symbols is the same as Korean language are overlooked.

In order to give clear understandings about the characteristics and superiority of the Korean alphabet to Korean people, growing children, and foreigners who study Korean language for the first time, backgrounds that have made the Korean alphabet complicated need to be carefully reviewed once more now. The reasons of making the Korean alphabet complicated and inconvenient should be identified and corrected one by one. Putting aside the shapes and functions of Korean letters, it is difficult to explain even the principles of creating the Korean alphabet based on the current printing type of the Korean letters.

On the other hand, even in Korean language teaching tools used for children, in which shapes of the Korean letters are made of magnets and combined into Korean characters, 28 Korean letters of consonants and vowels are individually provided, and Korean characters are implemented by combining the Korean letters. However, since the children recognize the same 'ㄱ's as different letters if the shapes thereof are different, a tool of a further simple structure is necessarily required to implement Korean characters.

Although the Korean alphabet has an original and concise structure as described above, it is used in a complicated and inconvenient way in reality, and thus it needs to further clearly inform that the Korean alphabet is original, superior, convenient, and constructed in a simple and concise system.

SUMMARY OF THE INVENTION

Accordingly, the present invention is conceived to solve the problems in the prior art as described above. An object of the present invention is to provide a tool for implementing Korean characters using a consonant-vowel combination system, in which a simple and concise combination system capable of implementing all Korean characters using only six consonants and vowels is constructed, and thus users of the tool may realize originality, superiority, and convenience of Korean letters in daily life.

In addition, another object of the present invention is to provide a tool for implementing Korean characters using a consonant-vowel combination system, which can be used as a teaching tool for growing children and foreigners, so that the learning effect aroused by stimulated interest can be further increased.

According to an aspect of the present invention for achieving the objects, there is provided a tool for implementing Korean characters using a consonant-vowel combination system, in which the Korean characters can be implemented by combining six consonant and vowel plates including: letter plate "ㄱ" formed to have a perpendicular shape, in which a horizontal length and a vertical length of an outer side are the same, and a horizontal length and a vertical length of an inner side are the same; letter plate "ㄴ" formed by symmetrically rotating letter plate "ㄱ" and adding a horizontal length of letter plate "ㄱ" to a bottom; letter plate "ㅇ" formed to have a diameter that is the same as a vertical length of letter plate "ㄴ"; letter plate "ㅏ" formed by rotating letter plate "ㄱ" clockwise into the shape of "ㄴ" disposing it at the upper side and adding the vertical length of the inner side of letter plate "ㄱ" beneath "ㄴ"; letter plate "—(short)" formed by rotating letter plate "ㅏ" in a horizontal direction to be the same as a horizontal length of letter plate "ㅏ"; and letter plate "|(long)" formed to have a total length of adding the horizontal length of letter plate "ㄱ" and the horizontal length of letter plate "ㅏ."

In addition, the consonant-vowel combination system is configured to have relational expressions of A=2B, C=A+B, and D=A+C by forming: letter plate "ㄱ" such that the horizontal length and the vertical length of the outer side are formed to have the same length 'A' and width and height of an inner space and width of both ends of letter plate "ㄱ" are formed to have the same length 'B'; letter plate "ㄴ" such that a horizontal length is formed to be the same as length 'A' of letter plate "ㄱ" and a vertical length is formed to be the same as length 'C' by adding length 'A' and length 'B' of letter plate "ㄱ"; letter plate "ㅇ" to have a diameter that is the same as length 'C' of letter plate "ㄴ"; letter plate "ㅏ" such that a vertical length is formed to be the same as length 'C' of letter plate "ㄴ" and width and length of a horizontal protrusion in a middle are formed to be the same as length "B" of letter plate "ㄱ"; letter plate "—(short)" such that a horizontal length is formed to be the same as length 'C' of letter plate "ㄴ" and width is formed to be the same as length 'B' of letter plate "ㄱ"; and letter plate "|(long)" such that length 'D' is formed by adding length 'C' of letter plate "ㄴ" "ㅏ" or "—(short)" to length 'A' of letter plate "ㄱ" and width is formed to be the same as length 'B' of letter plate "ㄱ."

In addition, letter plates "ㄱ," "ㄴ," "ㅇ," "ㅏ," "—(short)," and "|(long)" are made of magnets or magnets are attached to the letter plates.

DESCRIPTION OF THE PREFERRED EMBODIMENT

Hereinafter, a system for combining consonants and vowels according to the present invention will be described in detail with reference to the accompanying drawings.

The present invention constructs a simple and concise consonant-vowel combination system capable of implementing all modern Korean characters using only six consonant and vowel plates such as "ㄱ," "ㄷ," "ㅇ," "ㅏ," "— (short)," and "ㅣ (long)," and the configuration of the six consonant and vowel plates will be described in further detail with reference to FIGS. 1 to 6.

Figure 1:
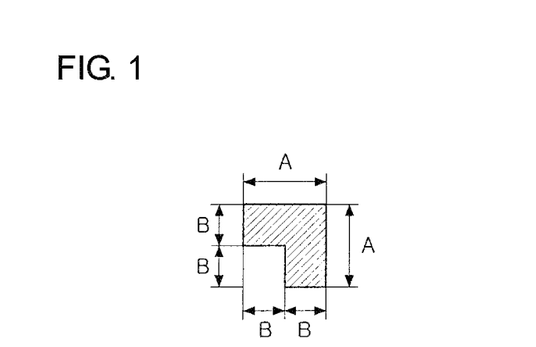
FIGS. 1 to 6 are exemplary views showing a process of forming six consonants and vowels according to the present invention.

FIGS. 1 to 6 are exemplary views showing a process of forming six consonants and vowels according to the present invention. As shown in FIG. 1, letter plate "ㄱ" is formed to have a perpendicular shape, in which a horizontal length and a vertical length of the outer side of the letter plate are the same, and a horizontal length and a vertical length of the inner side of the letter plate are the same. That is, the horizontal length and the vertical length of the outer side are formed to have the same length 'A' and the width and height of the inner space and the width of both ends of letter plate "ㄱ" are formed to have the same length 'B,' so that a relational expression of 'A=2B' is established.

Figure 2:
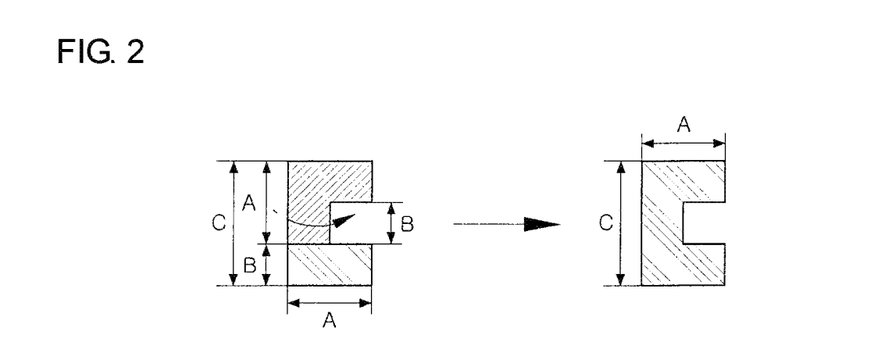

As shown in FIG. 2, letter plate "ㄷ" is formed by symmetrically rotating letter plate "ㄱ" and adding the horizontal length of letter plate "ㄱ" to the bottom thereof. A horizontal length of letter plate "ㄷ" is formed to be the same as length "A" of letter plate "ㄱ" and a vertical length thereof is formed to be the same as length 'C' by adding length 'A' and length 'B' of letter plate "ㄱ," so that a relational expression of 'C=A+B' is established.

Figure 3:
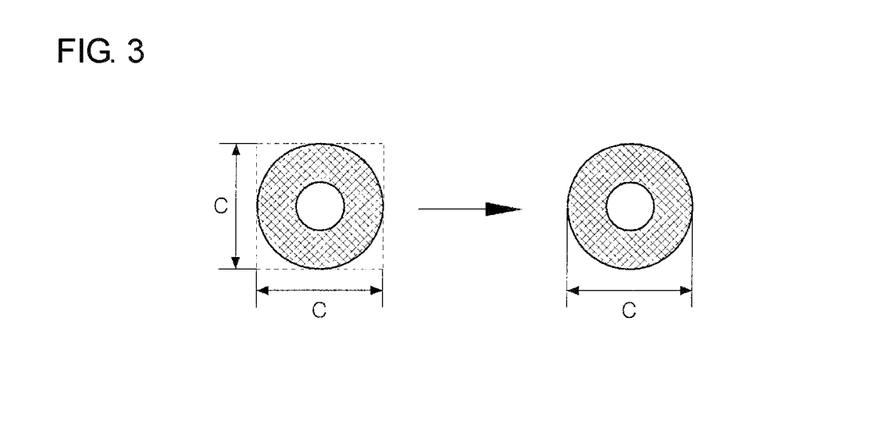

As shown in FIG. 3, letter plate "ㅇ" is formed to have a diameter that is the same as the vertical length of letter plate "ㄷ," which is formed to have a diameter of length 'C' of letter plate "ㄷ."

Figure 4:
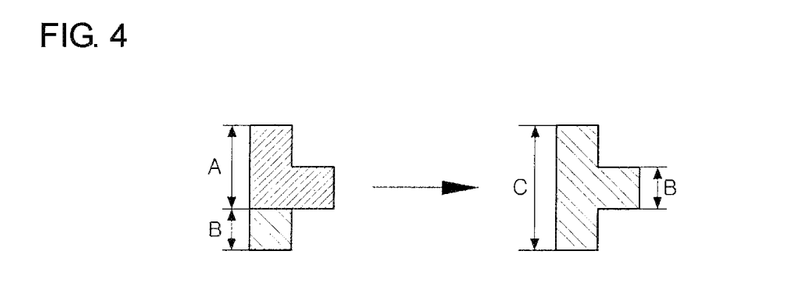

As shown in FIG. 4, letter plate "ㅏ" is formed by rotating letter plate "ㄱ" clockwise into the shape of "ㄴ," disposing it at the upper side and adding the vertical length of the inner side of letter plate "ㄱ" beneath "ㄴ." A vertical length of letter plate "ㅏ" is formed to be the same as length 'C' of letter plate "ㄷ," and the width and length of the horizontal protrusion in a middle of letter plate "ㅏ" are formed to be the same as length 'B' of letter plate "ㄱ."

Figure 5:
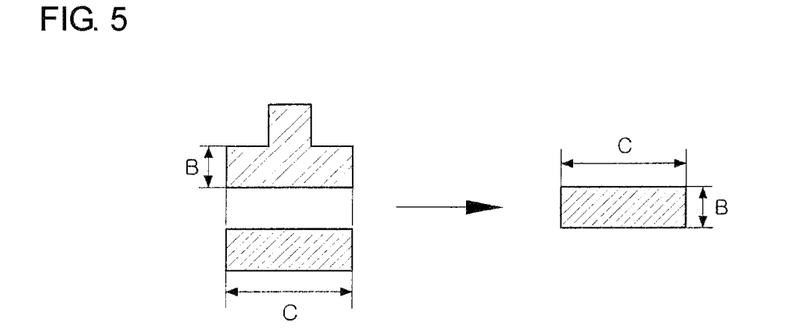

As shown in FIG. 5, letter plate "— (short)" is formed by rotating letter plate "ㅏ" in the horizontal direction to be the same as the horizontal length of letter plate "ㅏ." A horizontal length of letter plate "— (short)" is formed to be the same as length 'C' of letter plate "ㄷ," and the width thereof is formed to be the same as length 'B' of letter plate "ㄱ."

Figure 6:
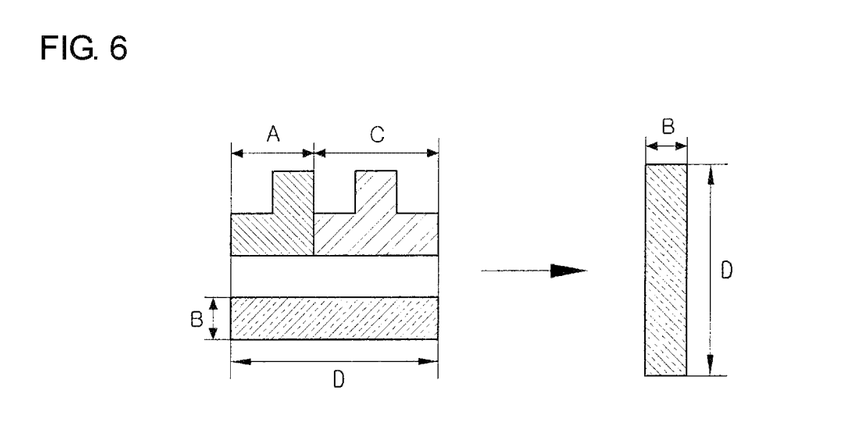

As shown in FIG. 6, letter plate "ㅣ (long)" is formed to have the total length of adding the horizontal length of letter plate "ㄱ" and the horizontal length of letter plate "ㅏ," in which length 'D' is formed by adding length 'C' of letter plate "ㄷ," "ㅏ," or "— (short)" to length 'A' of letter plate "ㄱ" and the width is formed to be the same as length 'B' of letter plate "ㄱ."

Accordingly, the present invention establishes a consonant-vowel combination system having relational expressions of A=2B, C=A+B, and D=A+C. Here, "(short)" and "(long)" are terms for expressing and distinguishing short and long of the length.

The other 11 consonants of "ㄴ," "ㄹ," "ㅁ," "ㅂ," "ㅅ," "ㅈ," "ㅊ," "ㅋ," "ㅌ," "ㅍ," and "ㅎ," 8 vowels of "ㅑ," "ㅕ," "ㅛ," "ㅠ," "ㅐ," "ㅒ," "ㅔ," and "ㅖ," double consonants such as "ㄲ," final consonants, and final double consonants, and final two-letter consonants such as "ㄳ" can be constructed by rotating or combining the six consonant and vowel plates.

Figure 7:
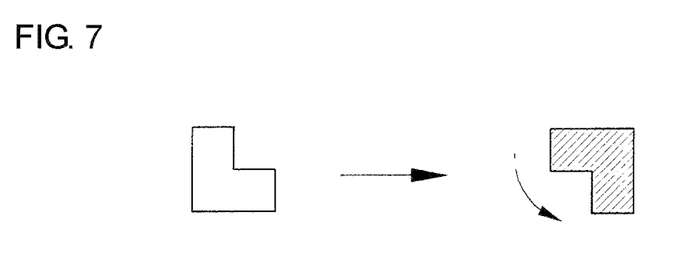
FIGS. 7 to 25 are exemplary views showing a process of forming the other consonants and vowels using the six consonants and vowels according to the present invention.
Figure 8:
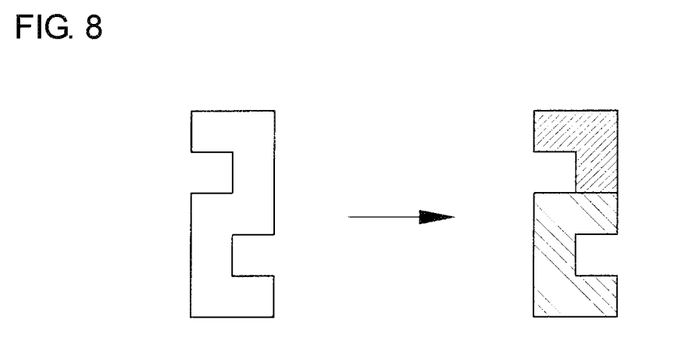

"ㄴ" is formed by rotating letter plate "ㄱ" as shown in FIG. 7, and "ㄹ" is formed by combining letter plates "ㄱ" and "ㄷ" as shown in FIG. 8.

Figure 9:
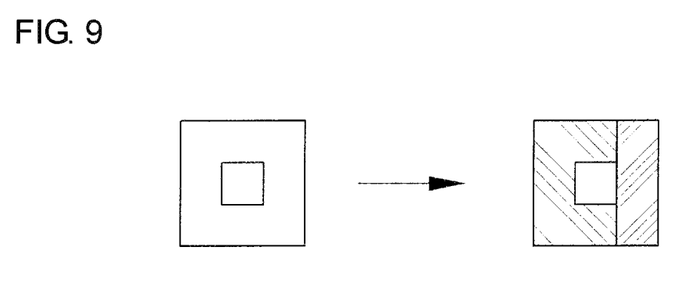
Figure 10:
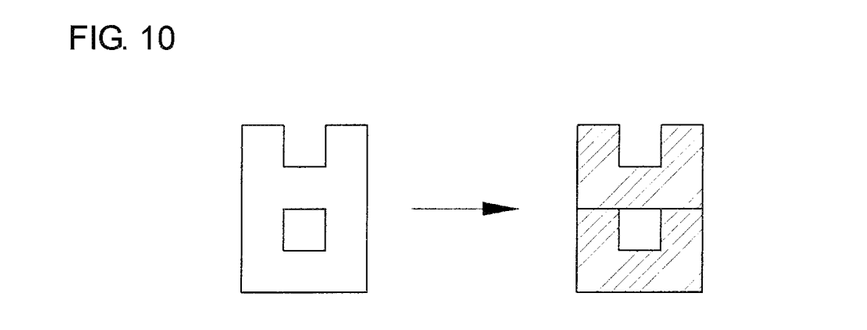

"ㅁ" is formed by combining letter plates "ㄷ" and "ㅣ (short)" as shown in FIG. 9, and "ㅂ" is formed by combining letter plates "ㄷ (rotating upward)" and "ㄷ (rotating upward)" as shown in FIG. 10.

Figure 11:
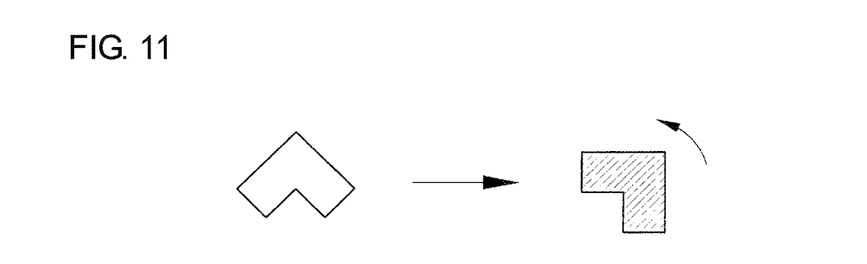
Figure 12:
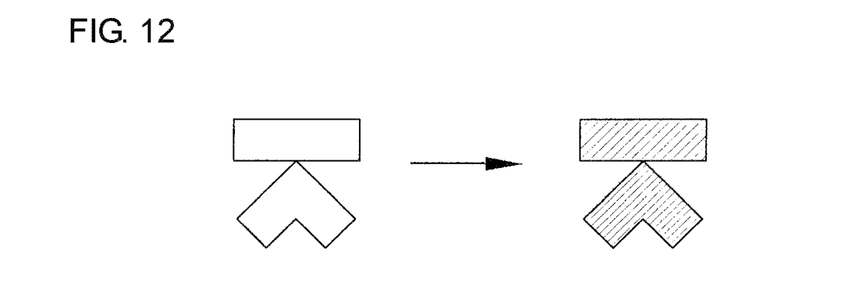

"ㅅ" is formed by rotating letter plate "ㄱ" as shown in FIG. 11, and "ㅈ" is formed by combining letter plates "ㄱ (rotating)" and "— (short)" as shown in FIG. 12.

Figure 13:
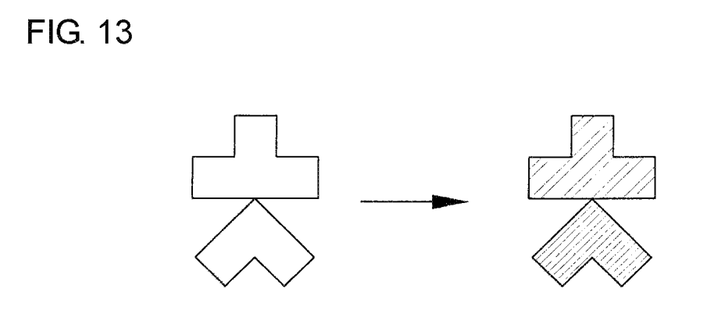

"ㅊ" is formed by combining letter plates "ㄱ (rotating)" and "ㅏ (rotating in the horizontal direction)" as shown in FIG. 13.

Figure 14:
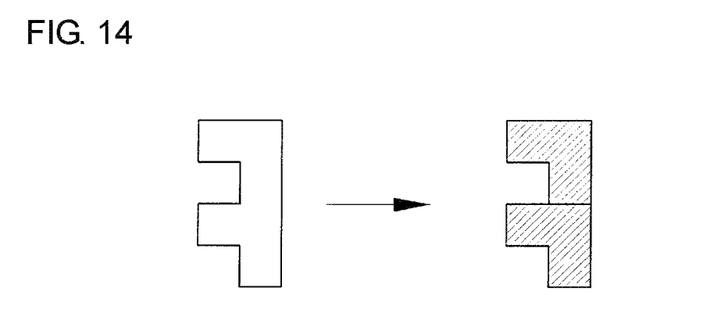
Figure 15:
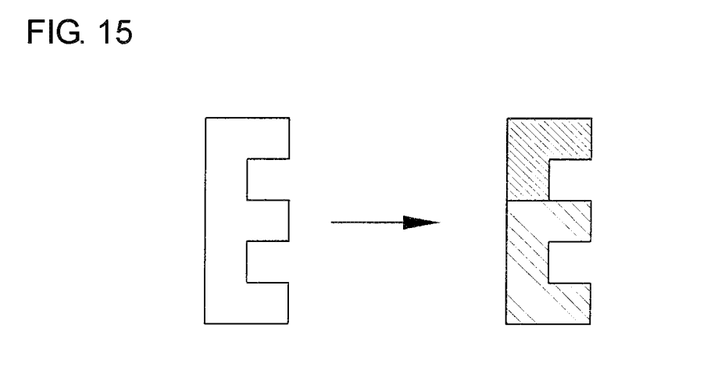

"ㅋ" is formed by combining letter plates "ㄱ" and "ㄱ" as Shown in FIG. 14, and "ㅌ" is formed by combining letter plates "ㄷ" and "ㄱ (symmetric)" as shown in FIG. 15.

Figure 16:
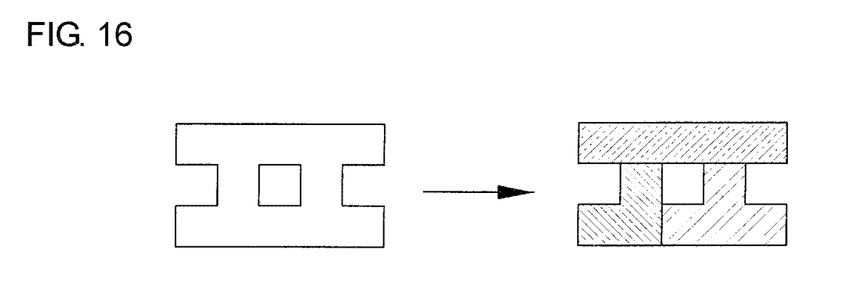
Figure 17:
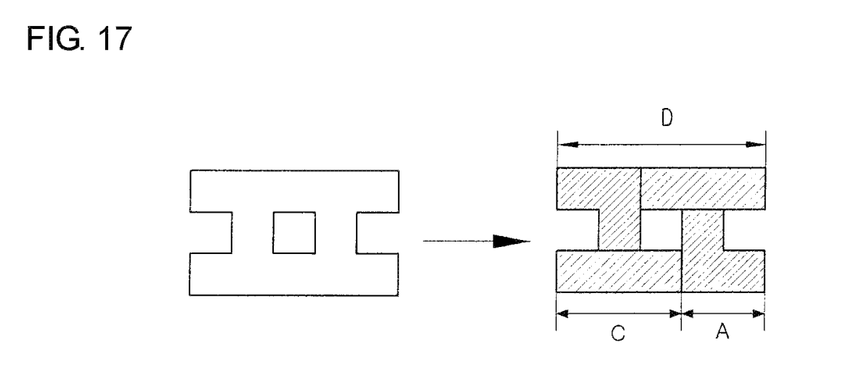

"ㅍ" is formed by combining letter plates "ㅣ (long) (rotating)," "ㄱ (rotating to be a symmetric shape of "ㄴ")," and "ㅏ (rotating in the horizontal direction)" or by combining letter plates "ㅣ (symmetric)," "— (short)," "ㅣ (rotating to be "ㄴ")," and "— (short)" as shown in FIGS. 16 and 17.

Figure 18:
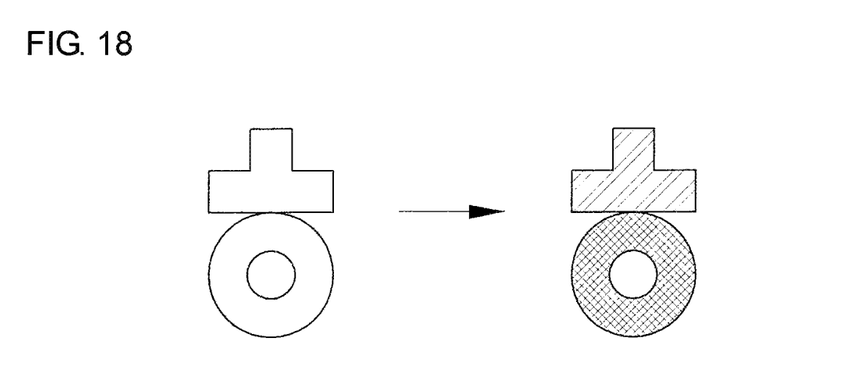

"ㅎ" formed by combining letter plates "ㅇ" and "ㅏ (rotating in the horizontal direction)" as shown in FIG. 18.

Figure 19:
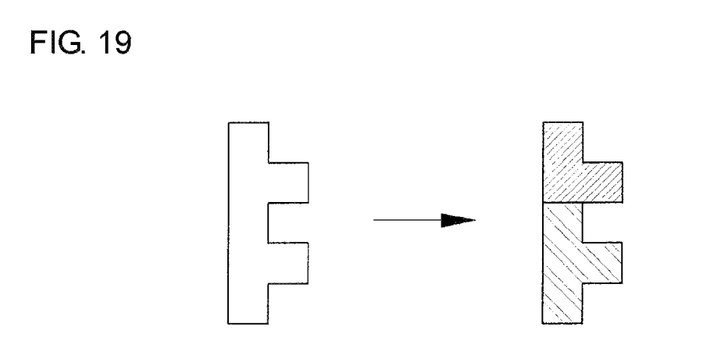
Figure 20:
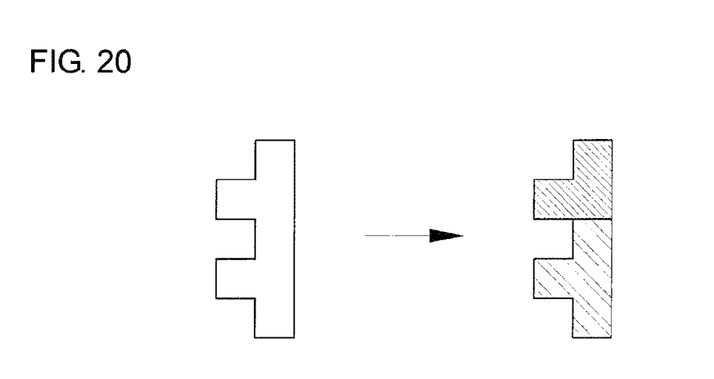
Figure 21:
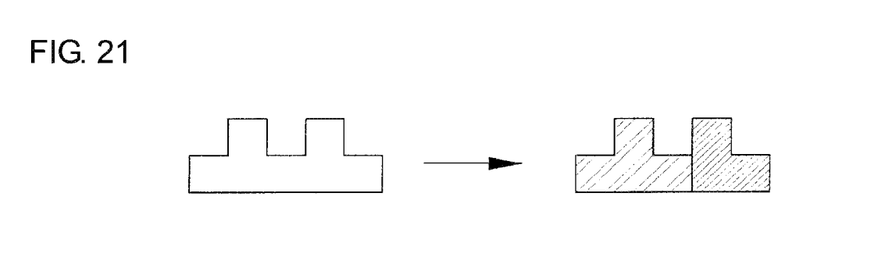
Figure 22:
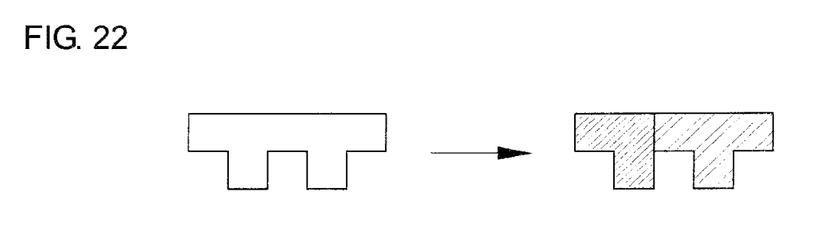

In addition, "ㅑ" is formed by combining letter plates "ㄱ (rotating to be "ㄴ")" and "ㅏ" as shown in FIG. 19, and "ㅕ," "ㅛ," and "ㅠ" are formed by symmetry or rotation of "ㅑ" as shown in FIGS. 20, 21, and 22.

Figure 23:
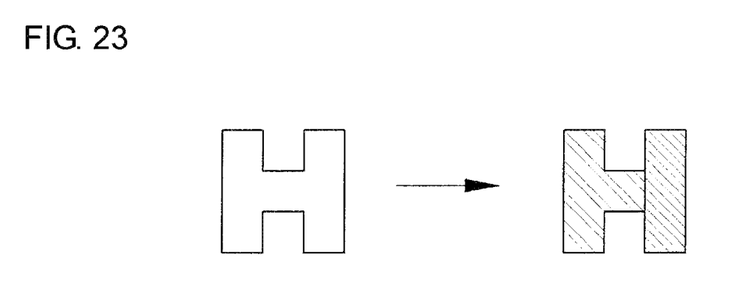

In addition, "ㅐ" is formed by combining letter plates "ㅏ" and "__ (short) (rotating in the vertical direction)" as shown in FIG. 23.

Figure 24:
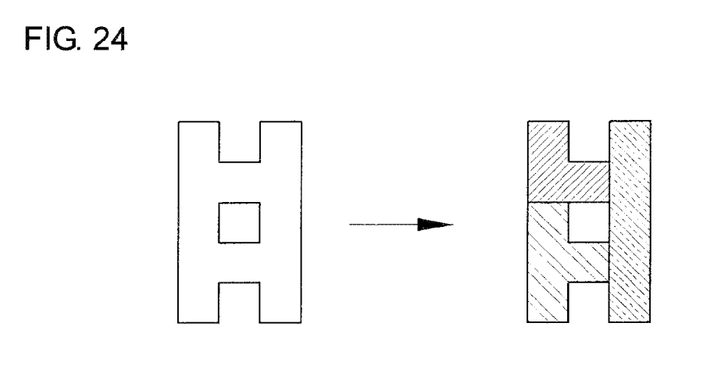

"ㅒ" is formed by combining letter plates "ㄱ (rotating to be "ㄴ")," "ㅏ," and "ㅣ (long)" as shown in FIG. 24, or by rotating "ㅛ" formed by combining letter plates "ㅣ (long) (rotating)," "ㄱ (rotating to be a symmetric shape of "ㄴ")," and "ㅏ (rotating in the horizontal direction)" or combining letter plates "ㄱ (symmetric)," "— (short)," "ㄱ (rotating to be "ㄴ")," and "— (short)" as shown in FIGS. 16 and 17.

Figure 25:
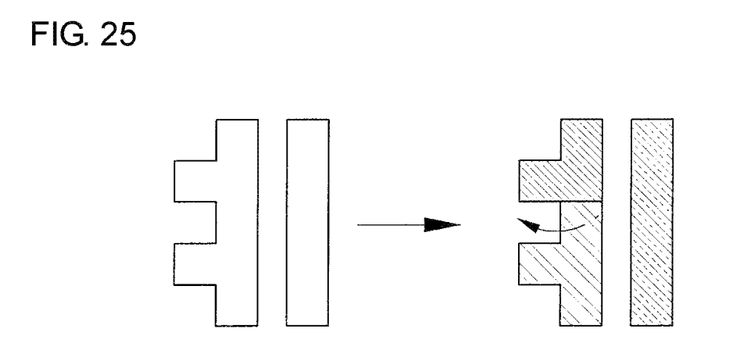

"ㅖ" is formed by combining letter plates "ㄱ (rotating to be a symmetric shape of "ㄴ")," "ㅏ (rotating to be a symmetric shape of "ㅏ")," and "ㅣ (long)" as shown in FIG. 25 in the same manner as "ㅒ."

Figure 26:
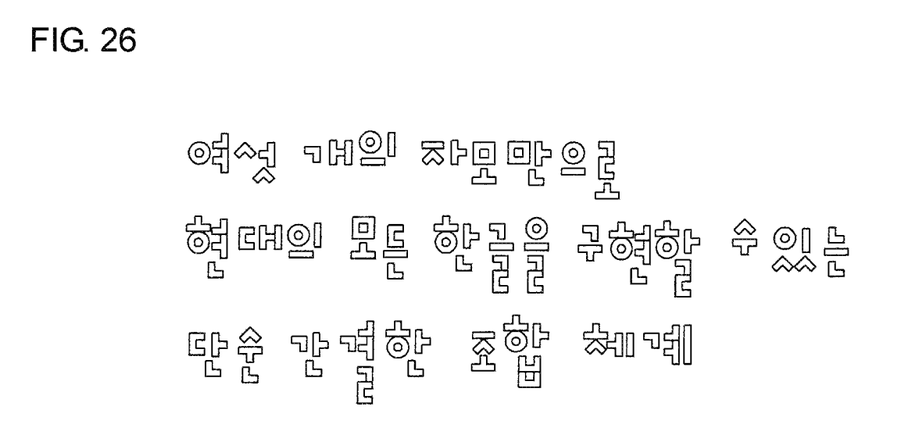
FIG. 26 is an exemplary view showing shapes of Korean characters implemented using the six consonants and vowels according to the present invention.

As described above, the present invention is a simple and concise combination system capable of implementing all modern Korean characters as shown in FIG. 26 by combining only the six consonant and vowel plates of "ㄱ," "ㄷ," "ㅇ," "ㅏ," "— (short)," and "ㅣ (long)" into the other consonants, vowels, and final consonants.

Figure 27:
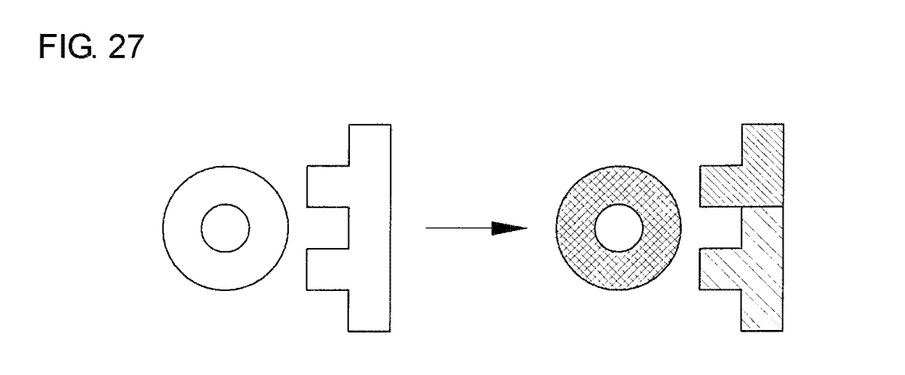
FIGS. 27 to 29 are exemplary views showing a combined state of the Korean characters shown in FIG. 26.
Figure 28:
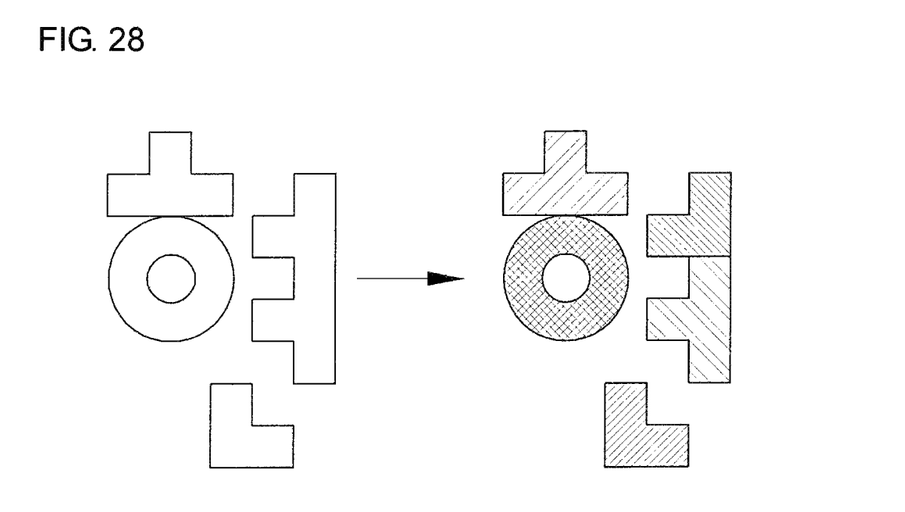
Figure 29:
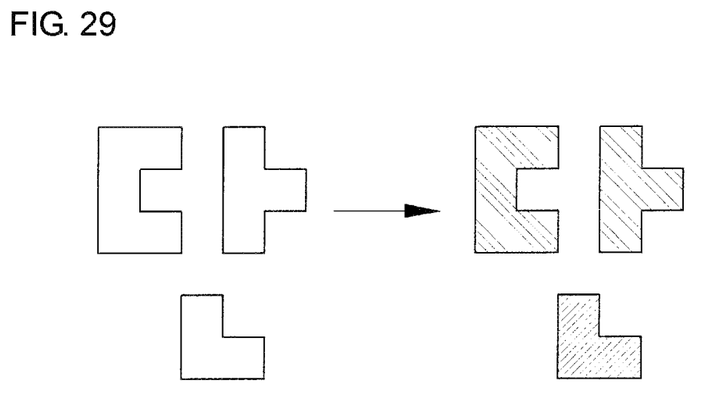

That is, "여" in FIG. 26 is formed by combining letter plates "ㅇ," "ㄱ (symmetrical with respect to a horizontal line), and "ㅏ (symmetric)" as shown in FIG. 27, "헌" is formed by combining letter plates "ㅗ," "ㅇ," "ㄱ (rotating to be a symmetric shape of "ㄴ"), "ㅏ (rotating to be a symmetric shape of "ㅏ")," and "ㄱ (rotating to be "ㄴ")" as shown in FIG. 28, and "단" is formed by combining letter plates "ㄷ," "ㅏ," and "ㄱ (rotating to be "ㄴ") as shown in FIG. 29.

Thus, all Korean characters can be implemented using only the six consonants and vowels described above.

On the other hand, if blocks or magnets are manufactured in the form of the six consonant and vowel plates of "ㄱ," "ㄷ," "ㅇ," "ㅏ," "ㅡ (short)," and "ㅣ (long)" described above or magnets are attached on the letter plates so that they are used as a playing or teaching tool for growing children or foreigners who study Korean language for the first time, the effect of learning Korean language aroused by stimulated interest will be increased, and users of the tool can directly feel originality, superiority, and convenience of Korean letters as well, and thus they will recognize value of the Korean letters from the heart and be proud of the Korean letters.

The present invention described above constructs a simple and concise consonant-vowel combination system capable of implementing all modern Korean characters using only six consonant and vowel plates of "ㄱ," "ㄷ," "ㅇ," "ㅏ," "ㅡ (short)," and "ㅣ (long)," so that users of the system may realize originality, superiority, and convenience of Korean letters in daily life, and thus they will recognize value of the Korean letters from the heart and be proud of the Korean letters.

Furthermore, magnets are manufactured in the form of the six consonant and vowel plates of "ㄱ," "ㄷ," "ㅇ," "ㅏ," "ㅡ (short)," and "ㅣ (long)" described above or attached thereon so as to be used as a teaching tool for growing children or foreigners, so that the effect of learning Korean language aroused by stimulated interest will be increased furthermore.

In addition, since manufacturing processes are simplified and effective in industrializing the Korean letters, the present invention may contribute to national economy.

Although a tool for implementing Korean characters using a consonant-vowel combination system according to the present invention has been specifically described above, which is only the most preferable aspect of the present invention, the scope of the present invention is not limited to the embodiment described and illustrated above but is defined by the appended claims. Those skilled in the art can make various modifications and changes thereto based on the details described in the present specification. However, it will be apparent that the modifications and changes do not depart from the scope of the present invention.

What is claimed is:

1. A tool for implementing Korean characters using a consonant-vowel combination system, wherein the Korean characters can be implemented by combining six consonant and vowel plates including:

letter plate "ㄱ" formed to have a perpendicular shape, in which a horizontal length and a vertical length of an outer side are the same and a horizontal length and a vertical length of an inner side are the same;

letter plate "ㄷ" formed by symmetrically rotating letter plate "ㄱ" and adding a horizontal length of letter plate "ㄱ" to a bottom;

letter plate "ㅇ" formed to have a diameter that is the same as a vertical length of letter plate "ㄷ";

letter plate "ㅏ" formed by rotating letter plate "ㄱ" clockwise into the shape of "ㄴ," disposing it at the upper side and adding the vertical length of the inner side of letter plate "ㄱ" beneath "ㄴ", letter plate "ㅡ (short)" formed by rotating letter plate "ㅏ" in a horizontal direction to be the same as a horizontal length of letter plate "ㅏ"; and letter plate "ㅣ (long)" formed to have a total length of adding the horizontal length of letter plate "ㅡ" and the horizontal length of letter plate "ㅏ".

2. The tool as claimed in claim 1, wherein the consonant-vowel combination system is configured to have relational expressions of A=2B, C=A+B, and D=A+C by forming:

letter plate "ㄱ" such that the horizontal length and the vertical length of the outer side are formed to have the same length 'A' and width and height of an inner space and width of both ends of letter plate "ㄱ" are formed to have the same length 'B', letter plate "ㄷ" such that a horizontal length is formed to be the same as length 'A' of letter plate "ㄱ" and a vertical length is formed to be the same as length 'C' by adding length 'A' and length 'B' of letter plate "ㄱ";

letter plate "ㅇ" to have a diameter that is the same as length 'C' of letter plate "ㄷ";

letter plate "ㅏ" such that a vertical length is formed to be the same as length 'C' of letter plate "ㄷ" and width and length of a horizontal protrusion in a middle are formed to be the same as length 'B' of letter plate "ㄱ";

letter plate "ㅡ (short)" such that a horizontal length is formed to be the same as length 'C' of letter plate "ㄷ" and width is formed to be the same as length 'B' of letter plate "ㄱ"; and letter plate "ㅣ (long)" such that length 'D' is formed by adding length 'C' of letter plate "ㄷ," "ㅏ," or "ㅡ (short)" to length 'A' of letter plate "ㄱ" and width is formed to be the same as length 'B' of letter plate "ㄱ".

3. The tool as claimed in claim 1, wherein letter plates "ㄱ," "ㄷ," "ㅇ," "ㅏ," "ㅡ (short)," and "ㅣ (long)" are made of magnets or magnets are attached to the letter plates.

4. The tool as claimed in claim 2, wherein letter plates "ㄱ," "ㄷ," "ㅇ," "ㅏ," "ㅡ (short)," and "ㅣ (long)" are made of magnets or magnets are attached to the letter plates.

* * * * *